United States Patent
Rahmel et al.

(10) Patent No.: US 7,268,517 B2
(45) Date of Patent: *Sep. 11, 2007

(54) METHOD AND SYSTEM FOR ENERGY RECLAMATION AND REUSE

(75) Inventors: Ronald S. Rahmel, Encinitas, CA (US); Gerald C. Gerace, Chula Vista, CA (US)

(73) Assignee: Science Applications International Corporation, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/107,841

(22) Filed: Apr. 18, 2005

(65) Prior Publication Data

US 2005/0186994 A1    Aug. 25, 2005

Related U.S. Application Data

(63) Continuation of application No. 09/670,613, filed on Sep. 27, 2000, now Pat. No. 6,882,128.

(51) Int. Cl.
*H04B 1/16*    (2006.01)

(52) U.S. Cl. .............. 320/101; 455/572; 455/343.1; 455/101

(58) Field of Classification Search ........ 455/572–573, 455/343.1, 343.5, 343.6; 320/101–102, 116–123, 320/134

See application file for complete search history.

(56) References Cited

U.S. PATENT DOCUMENTS

| | | | |
|---|---|---|---|
| 3,434,678 A | 3/1969 | Brown et al. ............... 244/1 |
| 3,852,755 A | 12/1974 | Works et al. ............... 343/701 |
| 3,927,375 A | 12/1975 | Lanoe et al. ................ 325/363 |
| 4,031,449 A | 6/1977 | Trombly ....................... 320/2 |
| 4,079,268 A | 3/1978 | Fletcher et al. ............ 307/151 |
| 4,360,741 A | 11/1982 | Fitzsimmons et al. ...... 307/151 |
| 4,628,299 A | 12/1986 | Tate et al. .................. 340/540 |
| 4,685,047 A * | 8/1987 | Phillips, Sr. ............... 363/126 |
| 5,043,739 A * | 8/1991 | Logan et al. ............... 343/701 |
| 5,068,669 A * | 11/1991 | Koert et al. ......... 343/700 MS |
| 5,416,486 A | 5/1995 | Koert et al. .................. 342/42 |
| 5,440,300 A | 8/1995 | Spillman, Jr. .......... 340/825.54 |
| 5,446,447 A * | 8/1995 | Carney et al. ............ 340/572.4 |
| 5,495,519 A | 2/1996 | Chen ........................... 379/58 |
| 5,659,237 A * | 8/1997 | Divan et al. ................ 320/119 |
| 5,659,465 A * | 8/1997 | Flack et al. .................. 363/71 |
| 5,710,988 A | 1/1998 | Suzuki et al. ................. 455/90 |
| 5,777,453 A * | 7/1998 | Imanaga ..................... 320/160 |
| 5,842,140 A * | 11/1998 | Dent et al. .................. 455/573 |
| 5,842,838 A | 12/1998 | Berg ........................... 417/331 |

(Continued)

OTHER PUBLICATIONS

Davies, "Operation of Information Satellites in an interference environment," Abstract, *Microwave Journal*, vol. 15, pp. 33-36, 1972. ("Microwave Journal").

(Continued)

*Primary Examiner*—Simon Nguyen
(74) *Attorney, Agent, or Firm*—Kilpatrick Stockton LLP

(57) ABSTRACT

The present invention relates to a system and method for harvesting ambient electromagnetic energy, and more particularly, to the integration of antennas and electronics for harvesting ubiquitous radio frequency (RF) energy, transforming such electromagnetic energy into electrical power, and storing such power for usage with a wide range of electrical/electronic circuits and modules.

44 Claims, 13 Drawing Sheets

U.S. PATENT DOCUMENTS

| | | | | |
|---|---|---|---|---|
| 5,889,383 | A * | 3/1999 | Teich | 320/107 |
| 5,898,932 | A | 4/1999 | Zurlo et al. | 455/573 |
| 5,970,393 | A | 10/1999 | Khorrami et al. | 455/66 |
| 6,037,743 | A * | 3/2000 | White et al. | 320/103 |
| 6,045,339 | A | 4/2000 | Berg | 417/332 |
| 6,121,752 | A * | 9/2000 | Kitahara et al. | 320/122 |
| 6,127,799 | A * | 10/2000 | Krishnan | 320/104 |
| 6,140,924 | A * | 10/2000 | Chia et al. | 340/572.5 |
| 6,154,664 | A | 11/2000 | Chorey et al. | 455/571 |
| 6,172,479 | B1 * | 1/2001 | Barton | 320/121 |
| 6,184,651 | B1 | 2/2001 | Fernandez et al. | 320/108 |
| 6,184,789 | B1 * | 2/2001 | Richley et al. | 340/571 |
| 6,198,250 | B1 | 3/2001 | Gartstein et al. | 320/112 |
| 6,259,372 | B1 * | 7/2001 | Taranowski et al. | 340/683 |
| 6,275,010 | B1 | 8/2001 | Neuteboom | 320/137 |
| 6,289,237 | B1 * | 9/2001 | Mickle et al. | 600/509 |
| 6,329,796 | B1 * | 12/2001 | Popescu | 320/134 |
| 6,369,759 | B1 | 4/2002 | Epp et al. | 343/700 MS |
| 6,426,917 | B1 | 7/2002 | Tabanou et al. | 367/82 |
| 6,597,465 | B1 | 7/2003 | Jarchow et al. | 358/1.12 |
| 6,609,013 | B1 | 8/2003 | Oh et al. | 455/561 |
| 6,847,834 | B1 * | 1/2005 | Leem | 455/572 |
| 6,882,128 | B1 * | 4/2005 | Rahmel et al. | 320/101 |
| 2002/0001745 | A1 * | 1/2002 | Gartstein et al. | 429/61 |

OTHER PUBLICATIONS

Dickinson, "Satellite Power System (SPS) Microwave Subsystem Impacts and Benefits," Abstract, *Report No. NASA-CR-157951*, 1977. ("Dickinson SPS").

Tonelli et al., "Design and analysis of a 5000-MW GaAlAs satellite power system," Abstract, *Proceedings of the 12th Intersociety Energy Conversion Engineering Conference Part II*, pp. 1412-1420, 1977. ("IECE 1").

Tonelli et al., "Design and evaluation of a 5 GW GaAlAs solar power satellite (SPS)," Abstract, *Proceedings of the 13th Intersociety Energy Conversion Engineering Conference Part I*, pp. 156-161, 1978. ("IECE 2").

Hughes, "The interactions of a solar power satellite transmission with the ionosphere and troposphere," Abstract, *AGARD Conference Proceedings No. 284. Propagation Effects in Space/Earth Paths*, p. 38, 1980. ("AGARD").

Maynard, "Initial MPTS study results: Design considerations and issues," Abstract, *Johnson Space Center Solar Power Satellite Microwave Transmission and Reception*, pp. 28-32, 1980. ("MPTS").

Noreen et al., "The system view," Abstract, *The Deep Space Network: A Radio Communication Instrumentation for Deep Space Exploration*, p. 25, 1983. (Deep Space Network).

Naumenko et al., "Trajectories of relativistic particles moving in free space," Abstract, *Radiotekhnika I Electronika*, vol. 29, No. 9, pp. 144-145, 1984. ("Relativistic Particles").

Yegerov, "The efficiency of energy transmission by an electromagnetic beam and its conversion in a rectenna," translated in *Soviet Journal of Communications Technology & Electronics*, vol. 30, No. 8, pp. 35-41, 1985. ("Energy Transmission").

Bianco, "Measurement Techniques for Evaluating Power System Interference to Instrument Landing Systems (ILS)," Abstract, *Canadian Electrical Association Contract/Grant Nos. CEA100T219 and CEA100T219A*, 1985. ("ILS").

Machina et al., "Power beaming—Energy transmission at 35 GHz and higher frequencies (for terrestrial and space applications with rectennas)," Abstract, *International Communication Satellite Systems Conference and Exhibit, 14th, Technical Papers, Part 3*, pp. 1671-1674, 1992. (Power Beaming).

Waldron, "Rectenna options for a lunar-solar power system," Abstract, *26th International Conference on Environmental Systems*, 1996. ("Rectenna Options").

Keerthi, "Analysis of the multistage CM array for digital communication signals," Abstract, *Conference Record of the Thirtieth Asilomar Conference on Signals, Systems and Computers*, vol. 2, No. 23, p. 1416, 1997. ("Asilomar").

Takeshi et al., "Experimental study of microwave power transmission efficiency," Abstract, *IEIC Technical Report, Institute of Electronics, Information and Communication Engineers*, vol. 98, No. 474, pp. 21-24, 1998. ("IEIC").

Vasudev, "Telecom explosion drives RF ICs," *Electronic Engineering Times*, No. 1016, p. 81, 1998. ("RF ICs").

Takyuki et al., "Effective utilization of electromagnetic energy. Effective utilization of electromagnetic energy in ITS (4). Radiocommunication in turnpike automatic charge collection system," Abstract, *Denji Kankyo Kogaku Joho EMC*, vol. 11, No. 9, pp. 38-45, 1999. ("ITS").

Ohr, "Integrated, one-chip cell phone is still a stretch, panelists concur," *Electronic Engineering Times*, No. 1067, p. 64, 1999. ("One-chip cell phone").

* cited by examiner

Antenna Design

Alternate Antenna Design

Two or Multiple Array Antenna Sense and Active Mode

Common Antenna used for Simultaneous Energy Harvesting, Sense and Active Mode

METHOD AND SYSTEM FOR ENERGY RECLAMATION AND REUSE

CROSS-REFERENCE TO RELATED APPLICATIONS

The current application is a continuation application of U.S. application Ser. No. 09/670,613 filed Sep. 27, 2000, which issued as U.S. Pat. No. 6,882,128.

BACKGROUND OF THE INVENTION

1. Field of the Invention

The present invention relates generally to wireless energy harvesting methods and systems. Specifically, the preferred embodiments of the present invention relate to the integration of antennas and electronics for harvesting ubiquitous electromagnetic energy, transforming that energy into useful power, and storing such power for usage.

2. Description of the Related Art

Typically, energy harvesting techniques and systems are focused on renewable energy such as solar energy, wind energy, and wave action energy from moving water. Solar energy is harvested by arrays of solar cells that convert radiant energy to DC power. Such energy is limited in low-light conditions. Cumbersome wind turbines that convert wind energy to electrical power depend on sufficient wind to spin the blades of the turbines to generate power. Wave action energy is harvested by water turbines or other apparatuses that are capable of converting the energy in the moving water into electrical power. This energy conversion is typically performed at complex hydroelectric power plants or by mechanical/electrical conversion apparatuses, such as those shown in U.S. Pat. Nos. 5,842,838 and 6,045,339 to Berg.

Another approach to energy harvesting is wireless power transmission via focused microwave signals. Unlike the above renewable energy technologies which harvest energy from natural sources, electrical energy of the wireless power transmission technology is remotely harvested and converted from focused microwave signals that are transmitted by a constructed source. For example, U.S. Pat. No. 5,043,739 to Logan et al. discloses a high frequency rectenna device for rectifying electromagnetic energy at microwave frequencies and higher and converting the energy into direct-current (DC) power to conduct wireless power transmission. Applications of this disclosure are focused on high-energy microwave radiation and high temperatures. One such application includes sending power to satellites or high altitude devices from the earth by electromagnetic waves. Another application involves collecting solar power from large space-based arrays of solar cells and transmitting the energy via electromagnetic waves to earth. A third application involves the direct conversion of microwaves generated by fusion reactions into a direct current.

BRIEF SUMMARY OF THE INVENTION

Currently, there is a large amount of renewable electromagnetic energy available in the radio frequency (RF) bands. For instance, AM radio, FM radio, TV, very high frequency (VHF), ultra high frequency (UHF), global system for mobile communications (GSM), digital cellular systems (DCS) and especially the personal communication system (PCS) bands are all lucrative energy sources. These untapped sources of energy grow more and more abundant as a result of the rapid growth in the wireless communication business. Hence, there is a desire to seek new methods and means of collecting the ubiquitous electromagnetic energy (ambient RF noise and signals) opportunistically present in the environment and transforming that energy into useful electrical power.

The preferred embodiments of the present invention can collect ubiquitous ambient radio frequency (RF) electromagnetic energy, convert it to a form useful for powering electronic devices, and store it for reuse. Thus, perpetual self contained subsystems or modules can be realized by using the reclaimed RF energy to power active antenna components, low power circuits, modules and other components such as transceivers, amplifiers, filters, etc. Hence, the preferred embodiments of the present invention can be applicable for any antenna or antenna array, for any antenna physical design (e.g., dipole, monopole, parabolic shape or dish, Yagi, etc.) and any frequency band. In some applications, this technology could be used advantageously and conveniently to transfer power remotely, without a physical connection, using a RF energy source intended for that purpose. In other applications, this technology could be used to maintain devices in a standby sleep mode indefinitely without ancillary power source. Then an RF signal could be used as a triggering mechanism to activate the device. Finally, for low power devices, this technology could provide primary power to the device and eliminate or reduce the traditional battery charge cycle.

Accordingly, the preferred embodiments of the present invention provide an integration of classical antenna physical materials and construction concepts with semiconductor and microprocessor technology to create an antenna structure capable of transforming electromagnetic waves into DC power. This antenna method and system collects and processes RF energy for reuse while simultaneously performing its primary function, such as signal reception, for a specific application. Furthermore, by using either a single antenna element or an array of elements configured to receive a broad range of frequencies in the present invention, energy collection and antenna transmit/receive performance can be maximized and optimized at the same time.

The preferred embodiments of the present invention also provide an Energy Reclamation System (ERS) that collects, converts and stores energy for use from selected frequency bands over the entire electromagnetic spectrum. These selected frequency bands are not required to be contiguous and may based on the operational environment, the application, any physical size limitations, and the technology available to cost effectively integrate an ERS into a device or application. An ERS of the present invention is not restricted to a single energy source because technologies like micro electromechanical systems (MEMS) can be used to integrate the collection of other types of energy, such as electromagnetic energy, solar energy, acoustic energy and/or casual motion energy. Thus, energy diversity enhances an ERS' ability to provide power consistent with the demands of modern devices and applications.

The preferred embodiments of the present invention also provide a method and system for harvesting electromagnetic spectrum energy from unintentional power sources. Thus, the electromagnetic energy may be harvested opportunistically from the abundant ambient RF electromagnetic environment created by the emission of countless commercial RF sources typically present today.

The preferred embodiments of the present invention also provide a method and system for harvesting electromagnetic spectrum energy using efficient wideband omnidirectional antennas for maximizing the collection of RF energy. The antennas can be of any design such as monopole, dipole, Yagi, or contrawound.

The preferred embodiments of the present invention also provide an energy collection and conversion technology that may be used to transmit a control signal to select a device's operating mode (e.g., wake up call in the standby sleep mode). Incorporating this technology into some devices allows them to remain in the sleep mode indefinitely. Thus, the devices may use the continuously reclaimed energy to power the monitoring circuitry and initialize equipment activation as required.

The preferred embodiments of the present invention also provide a method and system for transferring low power levels from an intentional power source advantageously and conveniently. This may be done remotely without a physical connection by using a RF energy source with a focused or blanket radiation pattern and an ERS at the target device. This may be used for numerous applications, including autonomous sensor or communication type applications in any environment (e.g., ground, air, underwater) where the device may use the ERS as its power source backup power source. For example, for underwater sensor locations, energy may come from sonar or other types of energy sources that can propagate with tolerable losses through the water and/or from RF energy delivered to a remote antenna extended above the surface of the water. If remaining operational for extended periods of time requires additional power, the device can be wirelessly and remotely supplied with power for storage and future use.

The preferred embodiments of the present invention further provide a conversion of the energy collected or captured by the antenna or transducer into an electrical current. The electrical current is then converted into a form suitable for input to a selected storage device. For instance, a rectifier and a low pass filter can be used to convert the electrical current into direct current (DC). This power can then be fed into a trickle charger for charging a power storage device, such as batteries, in wireless and other electrical devices. The type of electrical filter and power conditioning used depends on the type of battery or power storage device and the particular process of trickle charging used.

The preferred embodiments of the present invention additionally provide a method and system for harvesting electromagnetic energy that is designed to efficiently collect and convert RF energy using application specific integrated circuit (ASIC) technology. Hence, supporting electronics are integrated with the antenna itself and include, for example, amplifiers, mini-transceivers, trickle chargers for charging micro-cell batteries, filters efficient rectifier design and implementation (with different types of diodes), micro electromechanical systems (MEMS) RF transformers, etc. Thus, embedded circuitries are built into the antenna elements and optimized for a frequency range compatible with any given antenna design.

Additional aspects and novel features of the invention will be set forth in part in the description that follows, and in part will become more apparent to those skilled in the art upon examination of the disclosure.

BRIEF DESCRIPTION OF THE DRAWINGS

The preferred embodiments are illustrated by way of example and not limited in the following figures, in which.

DETAILED DESCRIPTION OF THE INVENTION

Figure 1:
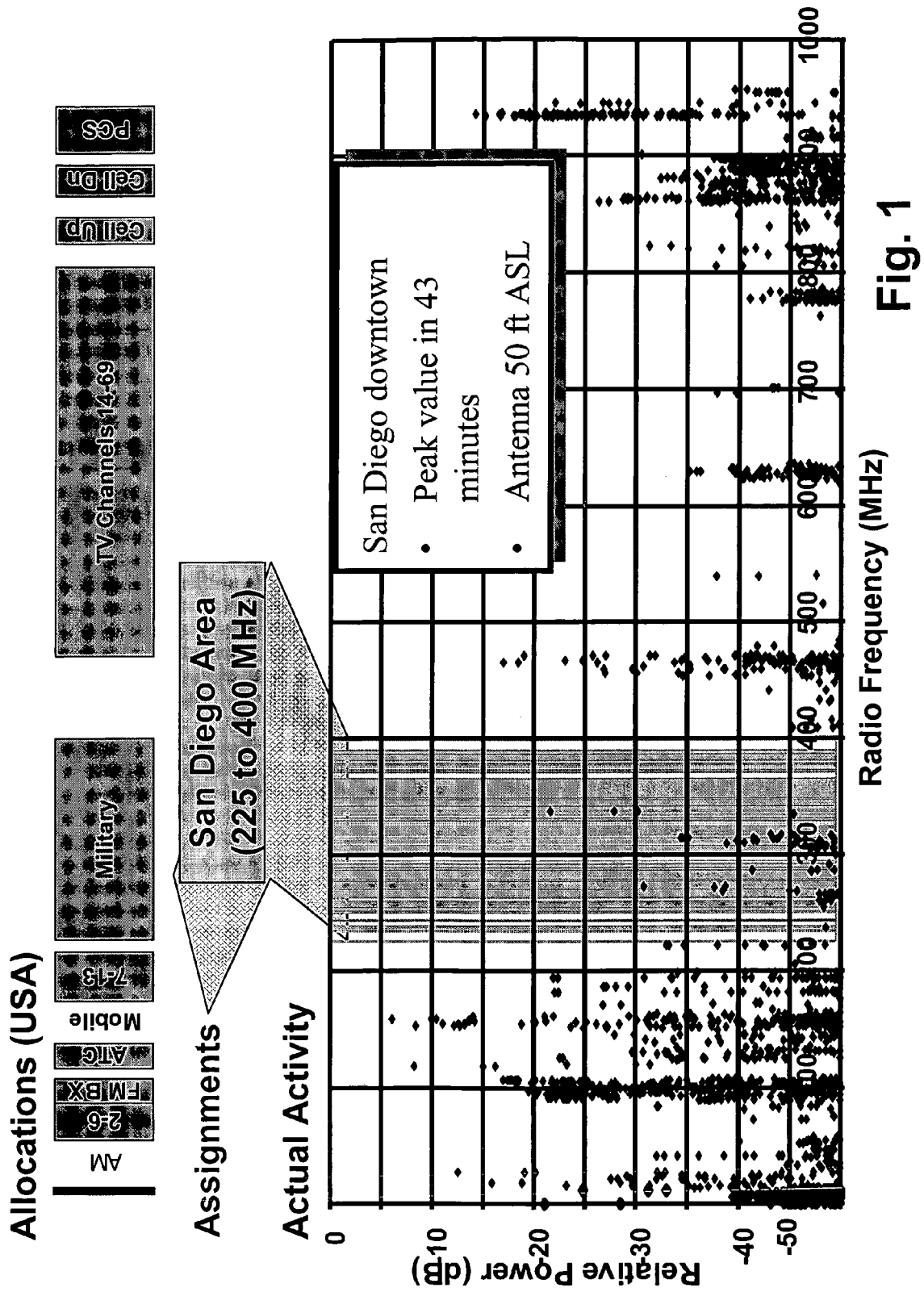
FIG. 1 shows data taken from measurements in the RF spectrum between 3 MHz and 1 GHz in downtown San Diego, Calif., USA.
Figure 2:
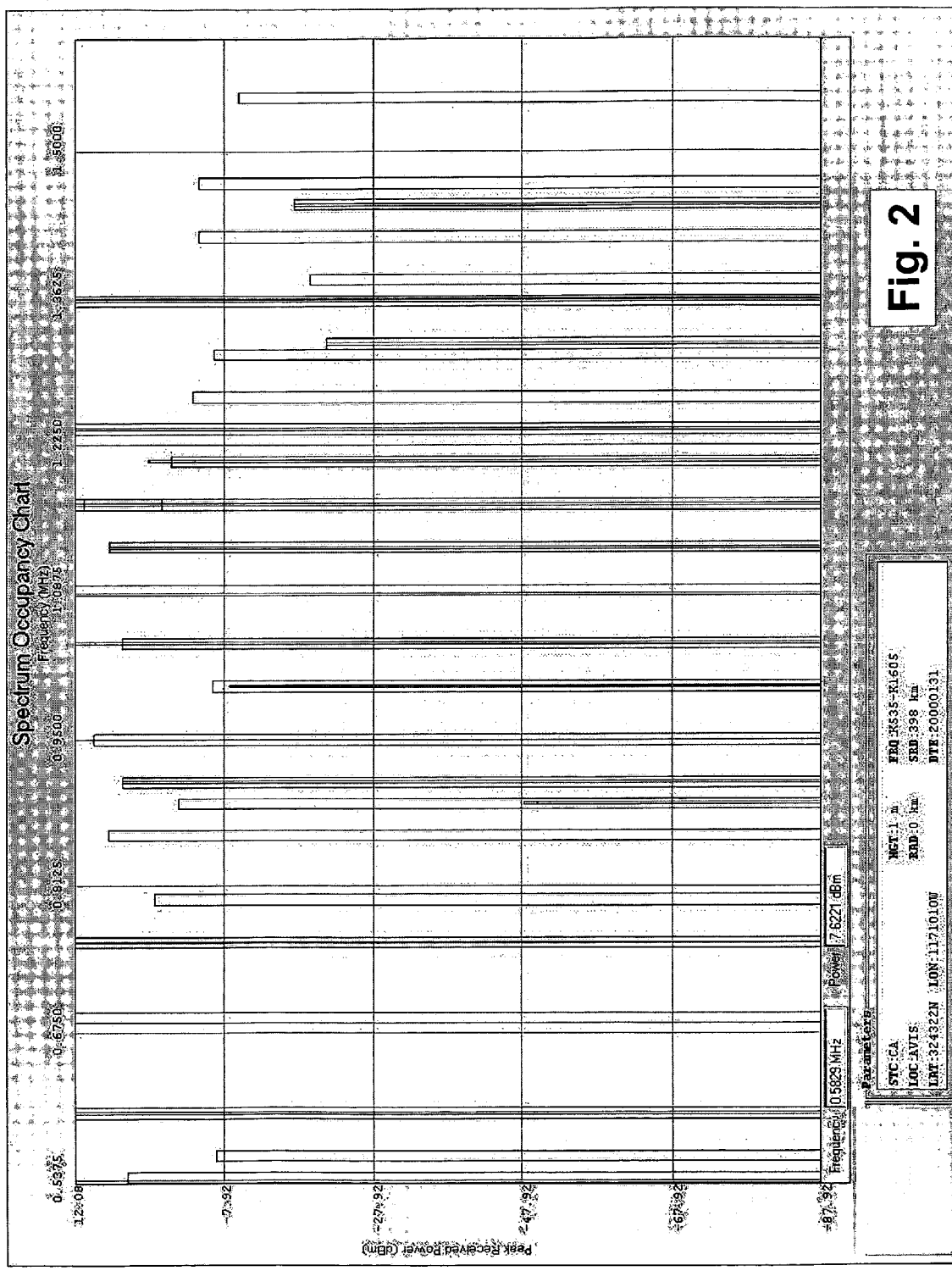
FIG. 2 shows the results of calculations predicting the signal levels in the AM radio band in downtown San Diego, Calif., USA.
Figure 3:
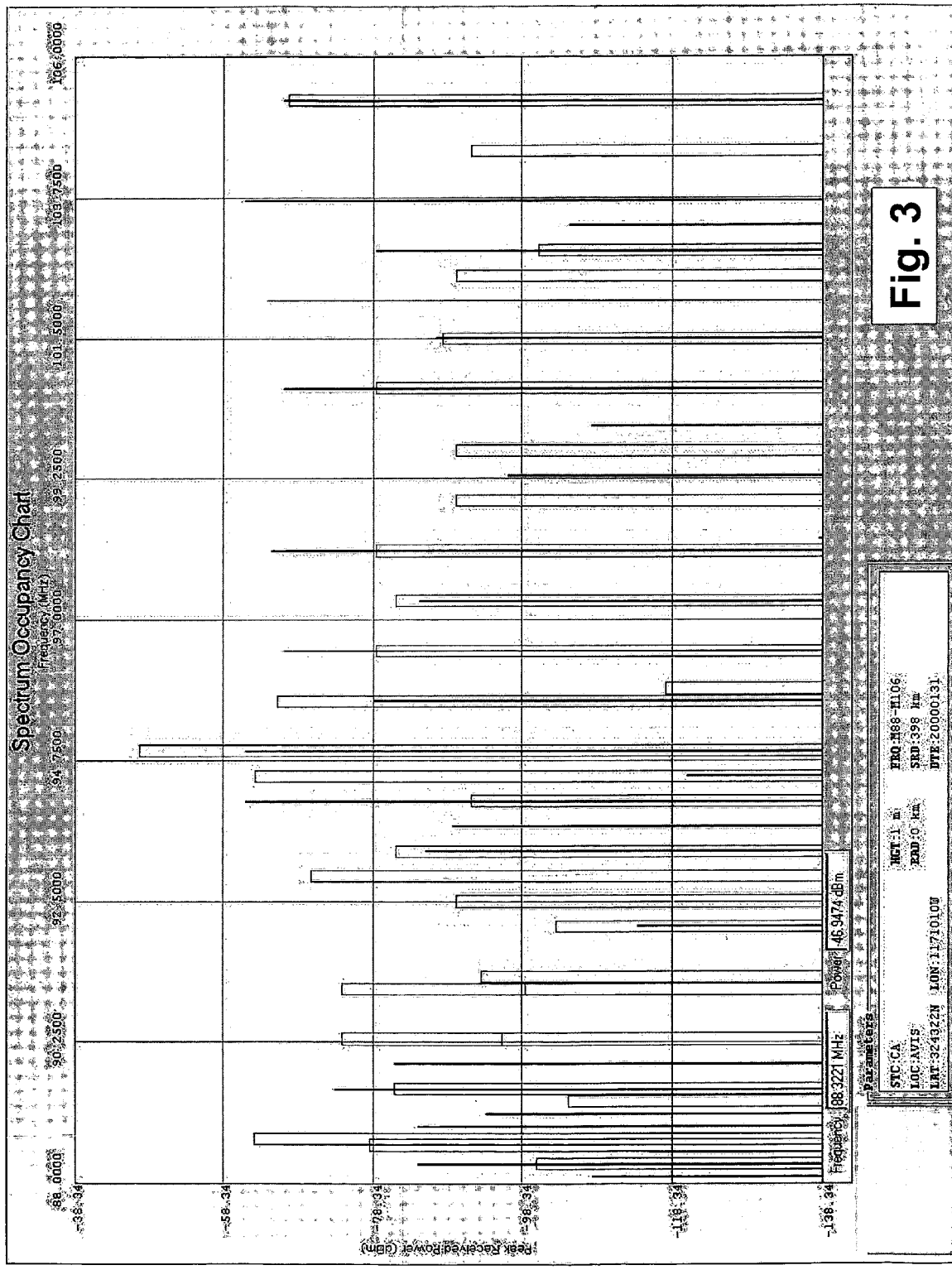
FIG. 3 shows the results of calculations predicting the signal levels in the FM radio band in downtown San Diego, Calif., USA.

The preferred embodiments of the present invention represent a new technology area for the reclamation and reuse of Radio Frequency (RF) power present due to either design or opportunity in certain frequency bands. It was found that RF signals and noise are available in useful power levels in many frequency bands—particularly in the AM, FM, and TV bands as well as the global system for mobile communications (GSM), digital cellular systems (DCS) and communication system (PCS) bands. The abundance of energy available for harvesting is clearly apparent from the measurements of the ambient RF spectrum. For example, FIG. 1 shows one such measurement in downtown San Diego Calif. The measurement indicates the relative power levels of RF signals between 3 MHz and 1 GHz that can be harvested at this location. As can be seen from the figure, there are ample RF signals from which to reclaim energy. FIG. 2 shows the results of calculations predicting the signal levels in just the AM radio band in downtown San Diego. It shows that many of the AM signals approach or are greater than 1 mW (0 dBm). This is because many commercial AM radio transmitters radiate thousands of watts of power. FIG. 3 shows the results of calculations predicting the signal levels in just the FM radio band in downtown San Diego.

These calculations further indicate that there are ample opportunities for harvesting energy from the ambient electromagnetic environment.

Countless candidate devices can benefit from this new energy reclamation technology of the present invention. For instance, the technology can be used for wireless devices that are typically powered by exhaustible or rechargeable batteries. The present invention can be used to provide wireless devices located in certain environments a perpetual life in standby mode and extended normal operational life by using stored reclaimed energy as a power source. The Energy Reclamation System or ERS of the present invention can provide sufficient power (e.g., 0.1-1 mW) to perpetually operate low power wireless devices without external recharging. The ERS of the present invention can also able to provide higher power levels to meet higher demands placed on these wireless devices. According to one preferred embodiment of the present invention, the ERS of the present invention includes a common antenna designed for the energy abundant frequency bands with it's output connected to power conditioning or rectification circuitry appropriately designed for that frequency range. The conditioned or rectified power can then be supplied to a charger (e.g., a trickle charger) or distribution subsystem designed to meet the battery's or storage device's charging specification.

There are innumerable potential applications for the energy reclamation technology of the present invention. For instance, the power harvested from radio frequency (RF) signals can be used for recharging installed power sources, providing power directly to the devices, energizing a device to wake up, and providing emergency backup power for the devices. Countless potential users of this technology also exist. For instance, potential users of the ERS technology may be found in the cellular, personal communications services (PCS) and future generations of wireless communications device industry. Typical consumer wireless electronic products that can be enhanced by ERS technology include, but are not limited to, palm computers, personal digital assistants (PDAs), pocket phones, pagers, cameras, autonomous sensors, garage door openers, remote controls and auto security systems. The energy reclamation technology can also be used in emergency location systems such as GPS position finders, airplane and watercraft emergency beacons and fire alarm systems. The energy reclamation technology can also be applied to wireless personal devices such as video conferencing cell phones, Internet phones and Wireless Personal Area Networks (WPAN). The energy reclamation technology is also flexible enough to be adapted for future electrical and/or electronics applications and devices.

According to a preferred embodiment of the ERS of the present invention, the ERS includes three subsystems: an Energy Harvesting Subsystem (EHS), an Energy Conversion Subsystem (ECS), and an Energy Storage Subsystem (ESS). The Energy Harvesting Subsystem or EHS includes various components used to collect ambient electromagnetic energy via an antenna or antenna array and convert it to electrical current. If acoustic, solar, or motion is the energy source, the antenna or antenna array may be replaced by a transducer or transducer array for the respective energy source. The EHS may also include a combination of antennas and mechanical transducers to collect different types of energy at once or alternately. The Energy Conversion Subsystem or ECS includes circuits, components, and modules integrated together to convert and condition the noise like current out of the antenna or transducer into a form of energy suitable for storage. The Energy Storage Subsystem or ESS includes, for example, batteries, capacitors, and other such components that will store the reclaimed energy for future reuse. The ESS can also include appropriate circuitry (e.g. trickle charger) for charging those devices that the ERS supports.

Figure 4:
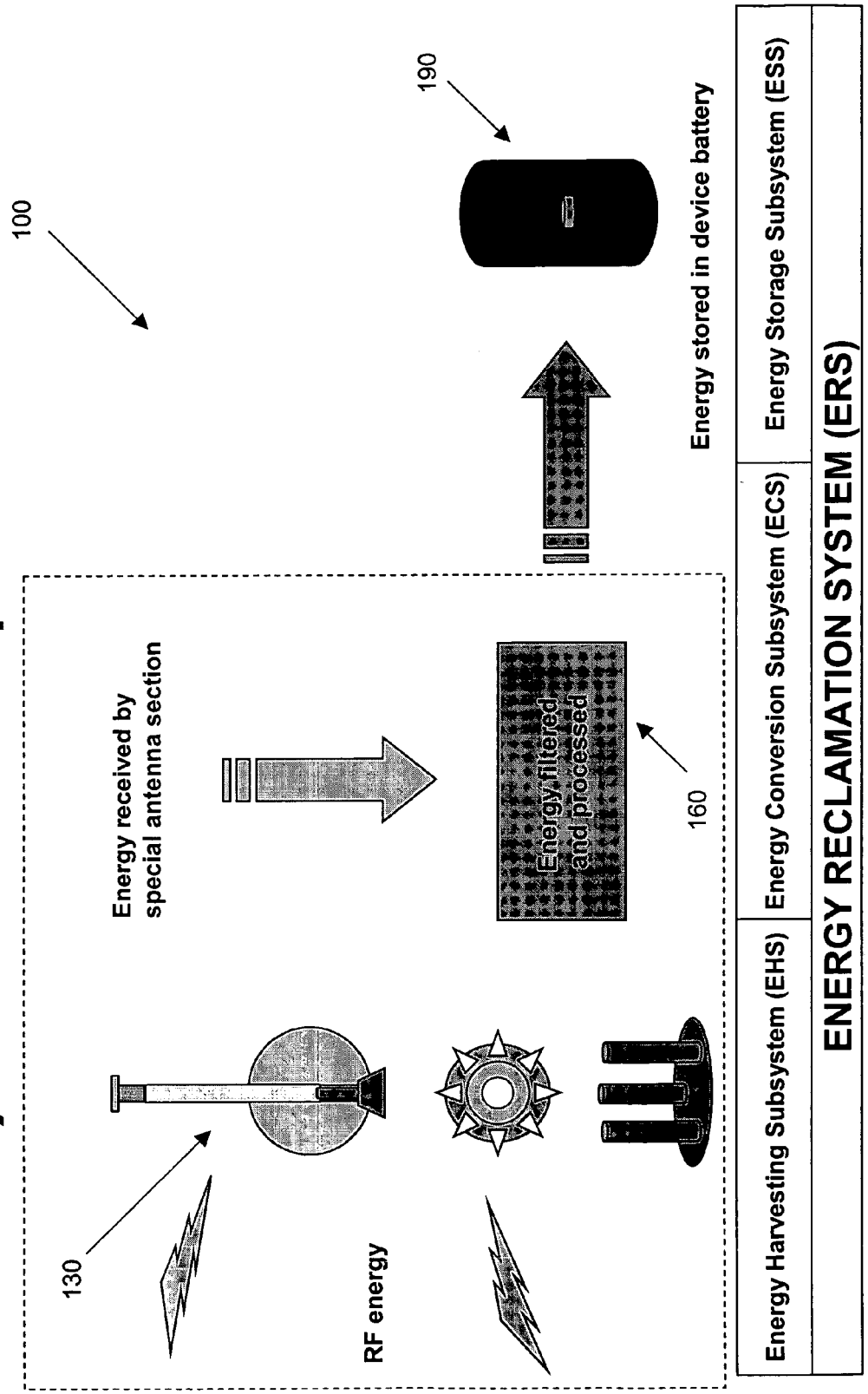
FIG. 4 shows the energy reclamation system (ERS) concept in accordance to one embodiment of the present invention.

FIG. 4 shows the ERS concept in accordance to the above preferred embodiment of the present invention. As shown, the ERS 100 includes three parts or subsystems: an Energy Harvesting Subsystem (EHS) 130, a Power or Energy Conversion Subsystem (ECS) 160, and a Power or Energy Storage Subsystem (ESS) 190. The Energy Reclamation System provides for the collection and harvesting of ubiquitous ambient energy over a desired frequency range. In a preferred embodiment, the desired range is 500 KHz-2.4 GHz. For frequencies above 2.4 GHz and for intentionally-radiated high power harvesting applications, the ERS can incorporate the rectenna technology, such as that disclosed in U.S. Pat. No. 5,043,739, into the EHS and the ECS for connection to the ESS. The interconnection of the ESS to the rectenna technology is readily apparent to one skilled in the art.

According to another preferred embodiment of the present invention, the main objective of the ERS 100 is focused on the collection of ambient RF energy present in the ambient environment in the range of 5 watts and below and converting that energy into reusable energy to power numerous electronic devices. The converted energy can be full-wave or half-wave rectified and filtered current. The charging schemes depend on how the ECS 160 is used and its reuse requirements. The output of the ECS 160 can be distributed for reuse to several different types of circuitry. In one embodiment, the converted power may be fed to a trickle charger circuitry that charges a standby energy storage device in the ESS 190 that includes a battery, capacitor, etc. while any excess power is distributed to a charging circuitry for the primary power storage component. Another way to distribute the ECS output power is to feed it directly into circuitry appropriate for affecting indefinite operation of the electronic device in a standby or sleep mode.

The three subsystems of the ERS system are now described in further details.

Energy Harvesting Subsystem (EHS)

The EHS for RF energy collection includes a single antenna of any physical design and shape (e.g., dipole, Yagi, Contrawound Toroidal Helical Antenna, etc.) or an array of such antennas to collect RF energy from any frequency or bands of frequencies. Appropriate baluns (i.e., balanced to unbalanced converters) and impedance matching techniques may be integrated to maximize power transfer into the energy conversion circuitry of the ECS.

For the ERS to reclaim the maximum amount of energy, the energy-harvesting antenna is preferably designed to be a wideband, omnidirectional antenna or antenna array that has maximum efficiency at selected bands of frequencies containing the highest energy levels. If the EHS includes an array of antennas, each antenna in the array can be designed to have maximum efficiency at the same or different bands of frequency from one another. The collected RF energy is then converted into usable DC power using high speed switching semiconductor devices or a diode-type or other suitable rectifier. This power may be used to drive, for example, an amplifier/filter module connected to a second antenna system that is optimized for a particular frequency and application. Thus, one antenna acts as an energy harvester while the other antenna acts as a signal transmitter/receiver. Transforming and/or storing the power garnered by the ERS technology over time makes those devices employing such technology more efficient and extends battery life.

According to a preferred embodiment of the present invention, the antenna design and construction preferably begins with defining a wide band of frequencies over which collection will be required. Next, optimal length or element size is preferably calculated to achieve maximum efficiency over that frequency range. As is apparent to one skilled in the art, antenna efficiency depends on a number of factors related to, for example, the physical design and shape of the antenna. Other factors affecting the amount of energy collected include signal strength at the receiving location from the transmitting source, which in turn depends on the paths from the transmitting source to the ERS of the present invention.

Once the optimal length or element size of the antenna is calculated, it is subsequently reduced to a fraction of a wavelength while integrating semiconductor amplification and impedance matching circuits in the construction of the antenna elements. The antenna circuit elements are preferably constructed using microprocessor wafer manufacturing techniques and shaped for integration or encapsulation in the antenna elements. This preferred design approach reduces the physical size of the antenna while retaining the energy collection efficiencies of a larger antenna. Antenna efficiency of 50% or more is preferred, for higher antenna efficiency resulting in higher energy collection.

Figure 5B:
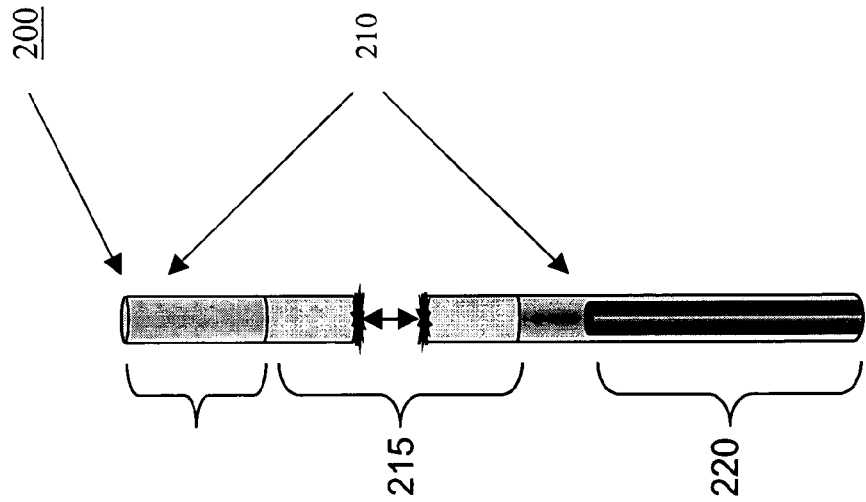
FIGS. 5A and 5B show a physical structure of an energy harvesting antenna and an array of such antennas in accordance to an embodiment of the present invention.
Figure 5A:
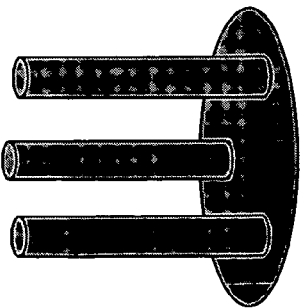

FIG. 5A shows the physical structure of an energy-harvesting antenna and FIG. 5B shows an array of such antennas in accordance to an embodiment of the present invention. The cylindrical physical design shape was selected for easy explanation of the design concept; however, any physical shape (e.g., toroid, etc.) may evolve that still meets the ERS design concepts and goals. As shown, the antenna 200 includes a standard metal outer sleeve 210. Under the sleeve 210 is a semiconductor material 215 used to create an apparent physical length optimized for reception to accommodate size limitations. Enclosed by the antenna outer sleeve 210 and semiconductor material 215 is electronic circuitry 220, which is constructed using microprocessor and ASIC semiconductor technology to develop integrated support modules such as trickle charger, amplifier and filter for the ECS, which will be described later. The outer sleeve 210 may also be used as a heat sink for the electronic circuitry 220.

Figure 6:
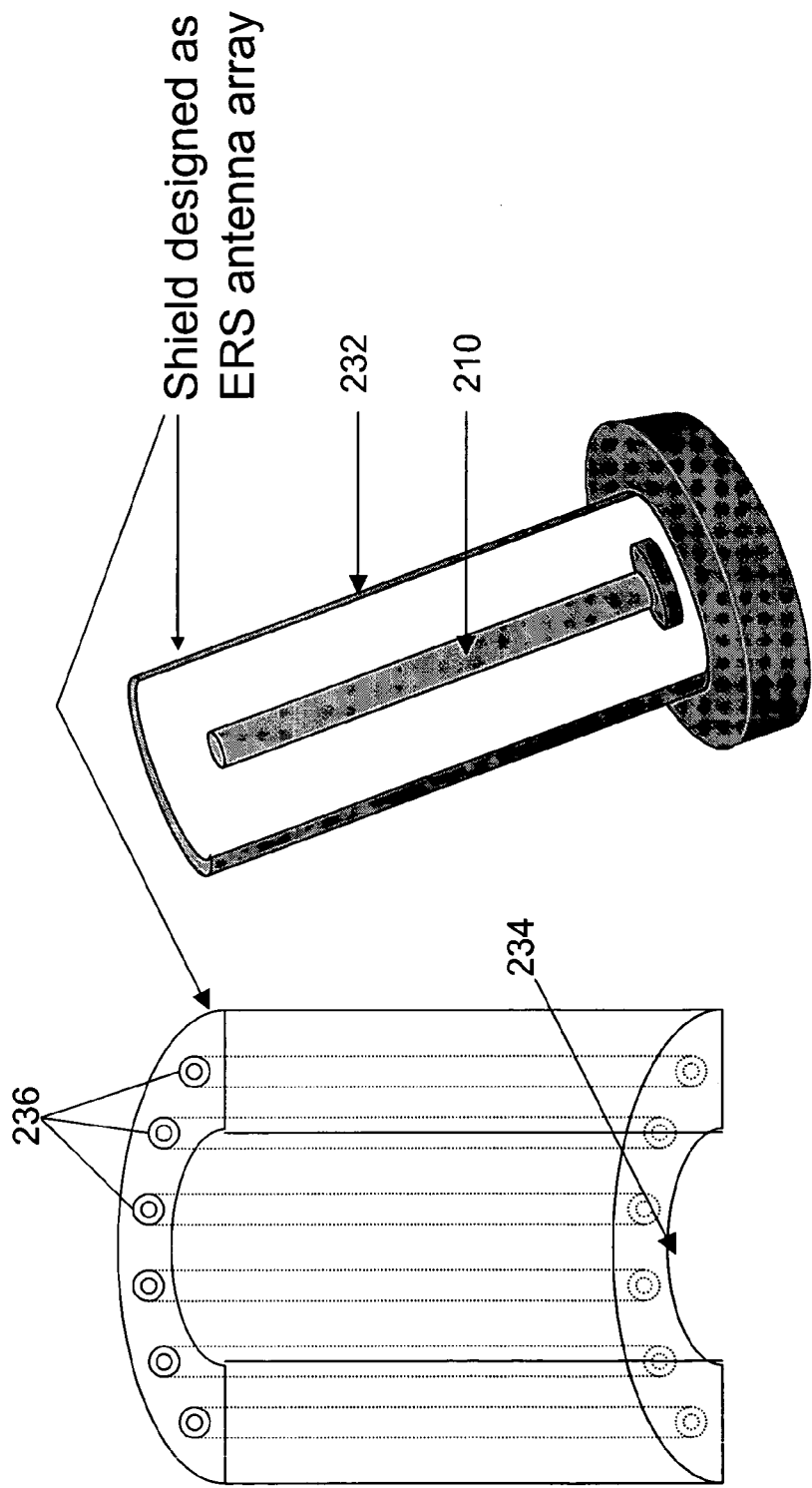
FIG. 6 shows a communication antenna having an insulated shield acting as both a safety shield to the user and an energy harvesting antenna array in accordance to an embodiment of the present invention.

According to another preferred embodiment of the present invention, the antenna can also be constructed to comply with recent radiation hazard concerns with wireless and cellular telephone technologies and at the same time increases power collection potential. There are a number of ways to direct the RF energy away from the user or shield the user using cupped shields in the antenna system design. Such design could be optimized to provide an insulated shield and enhance energy collection materials in the antenna system construction. FIG. 6 shows an antenna 210 covered by an insulated shield 232. The antenna 210 performs its primary function for a specific application, such as receiving RF signals for normal wireless communication. The insulated shield 232 can be used as an electromagnetic shield and also as an ERS antenna or antenna array for energy harvesting. As shown in the figure, the RF shielding material is preferably located on the inside surface 234 of the shield 232. As is known in the art, the shielding material may be of any material suitable for shielding RF radiation generated by the transmitting antenna 210. Within the shield 232 is an antenna array 236, with associated integrated modules of the ECS, for energy harvesting. Alternatively, within the shield 232 is a single antenna for energy harvesting. Each antenna in array 236 or the alternative single antenna is depicted in FIG. 5A.

Figure 7:
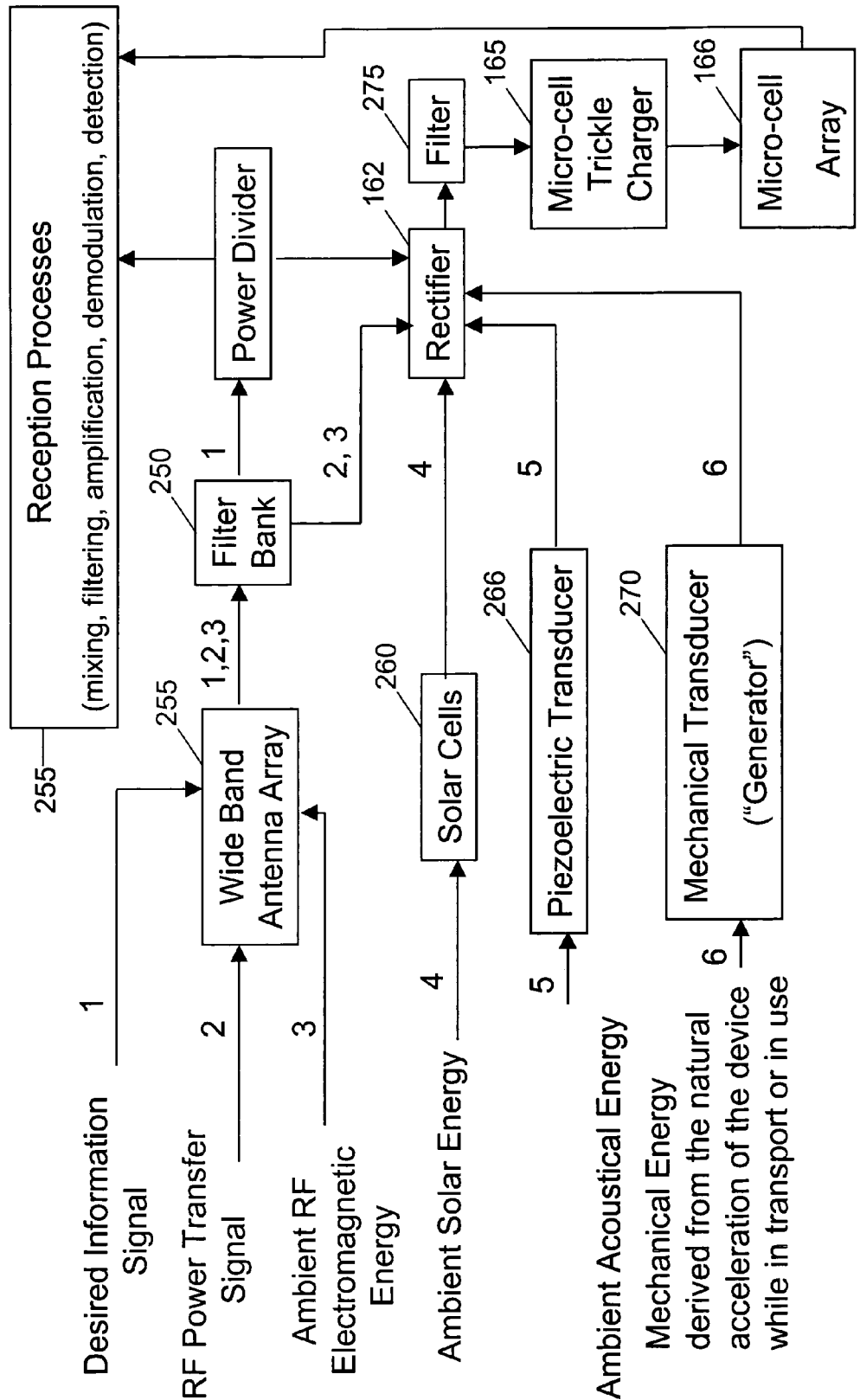
FIG. 7 shows a high level schematic diagram of an Energy Harvesting Subsystem (EHS) in accordance to one embodiment of the present invention.

FIG. 7 shows a high level schematic diagram of an Energy Harvesting Subsystem (EHS) in accordance to one embodiment of the present invention. The EHS includes a wideband omnidirectional antenna or antenna array 255 for energy harvesting, as described earlier. The antenna 255 may be used to harvest energy from ambient RF signals 3 and/or RF power transfer signal 2 from a remotely-located, intentional power source. It may also be used to concurrently receive the desired communication signal 1 along with the energy-harvesting signals 2 and 3. The combined signals are then separated by filter bank 250 which will be described in greater detail later.

FIG. 7 also shows that other energy harvesting technologies for collecting ambient solar, acoustical, and mechanical energy can be integrated as part of the EHS to supply electrical energy into the ECS. The electrical energy supplied by these other energy harvesting technologies may interface with the rectifier 162 and/or filter circuitries 250, which is then fed to filter 275 in the ECS. As apparent to one skilled in the art, the ECS interface depends on the input frequency, quality, quantity and type (constant DC or some form of pulsating DC) of energy supplied.

For ambient solar energy, an array of solar cells or a solar energy conversion device 260 known in the art (such as a MEMS solar/heat electric generator) is preferably used to absorb solar energy from the environment and convert it to electrical energy. This energy is then delivered to a rectifier 162 of the ECS. An array of solar cells may be used to produce sufficient power for a variety of applications.

For ambient acoustical energy, a piezoelectric transducer 266 known in the art can be used to absorb ambient or intentional sound from the environment, which in turn causes a crystal to vibrate and through the piezoelectric effect produce an output voltage. The output energy is then delivered to the rectifier 162 of the ECS. An array of transducers may be used to produce sufficient power for a variety of applications.

For mechanical energy, the energy is preferably converted to electric energy through a MEMS Mechanical Transducer (Generator) 270 known in the art. The MEMS Mechanical Transducer 240 takes mechanical energy derived from the natural acceleration of a thing or person while in transport (e.g., person walking) or in use. These devices can wind a spring, force a piston to move or use some other method to store and convert acceleration energy collected into electrical energy. The output energy is then delivered to the rectifier 162 of the ECS. An array of such transducers may be used to produce sufficient power for a variety of applications.

Energy Conversion Subsystem (ECS)

Figure 8:
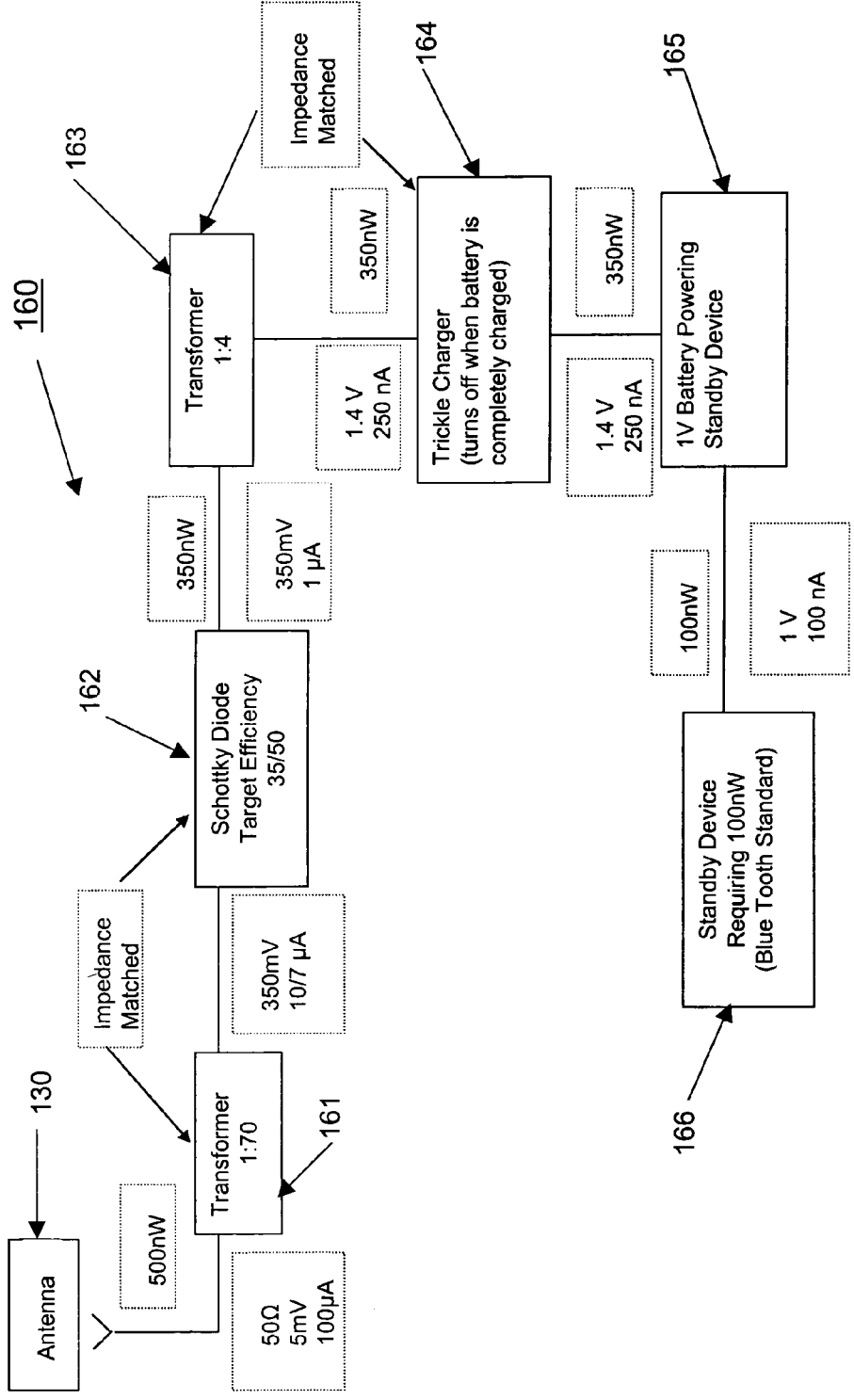
FIG. 8 shows an energy conversion subsystem (ECS) of a perpetual active antenna (PAA) system in accordance to one embodiment of the present invention.

According to a preferred embodiment of the present invention, the ECS for RF energy collection includes a power charger and other circuitry for performing RF to DC power conversion. Because the energy harvesting in the present invention is focused mainly on recovering small amounts of energy over long periods of time, charging energy storage devices (rechargeable batteries, etc.) may be done over a period of time by trickle charge. As is known in the art, trickle charging is a charging scheme in which a power storage component is charged at a fraction of its capacity rate. FIG. 8 shows an ECS 160 for use in conjunction with the EHS to perform RF to DC power conversion, with specifications in accordance to an embodiment of the present invention.

The ECS 160 preferably includes a transformer 161 connected to an energy harvesting antenna 130 for receiving the RF energy. The transformer 161 is also connected to a diode rectifier circuit 162. The transformer 161 and the rectifier circuit 162 are designed to match impedance with one another to prevent undesired energy loss between these two elements. After rectification, the converted energy is sent through another transformer 163 and onward to a trickle charger 164. Again, the second transformer 163 and the trickle charger 164 are designed to match impedance with one another to prevent undesired energy loss between these two elements. The trickle charger 164 is then used to deliver power to a battery 165 for storage and use with an electronic device, such as a standby device 166. The battery is actually a part of the ESS, which will be described later.

If an array of energy harvesting antennas is used to receive the RF energy, the power collected from all channels (i.e., the power density at all antenna inputs) can be combined, rectified and forwarded to the trickle charger 164. The power available in each channel is comparable; thus, for example, if 100N nW is required for a load, the power collected in N channels at 100 nW each can be combined to generate the required power.

Although not shown in FIG. 8, the converted and rectified power may be fed through a filter for signal purification prior to sending it to the transformer 163 and onward to the trickle charger 164. FIG. 7 shows the use of such filter 275, with like numbers for like elements shown in FIG. 8. It should be noted that FIG. 7 depicts a broad overview of the ERS concept according to an embodiment of the present invention; therefore, the figure does not show all detailed components of the ECS as shown in FIG. 8.

Figure 9:
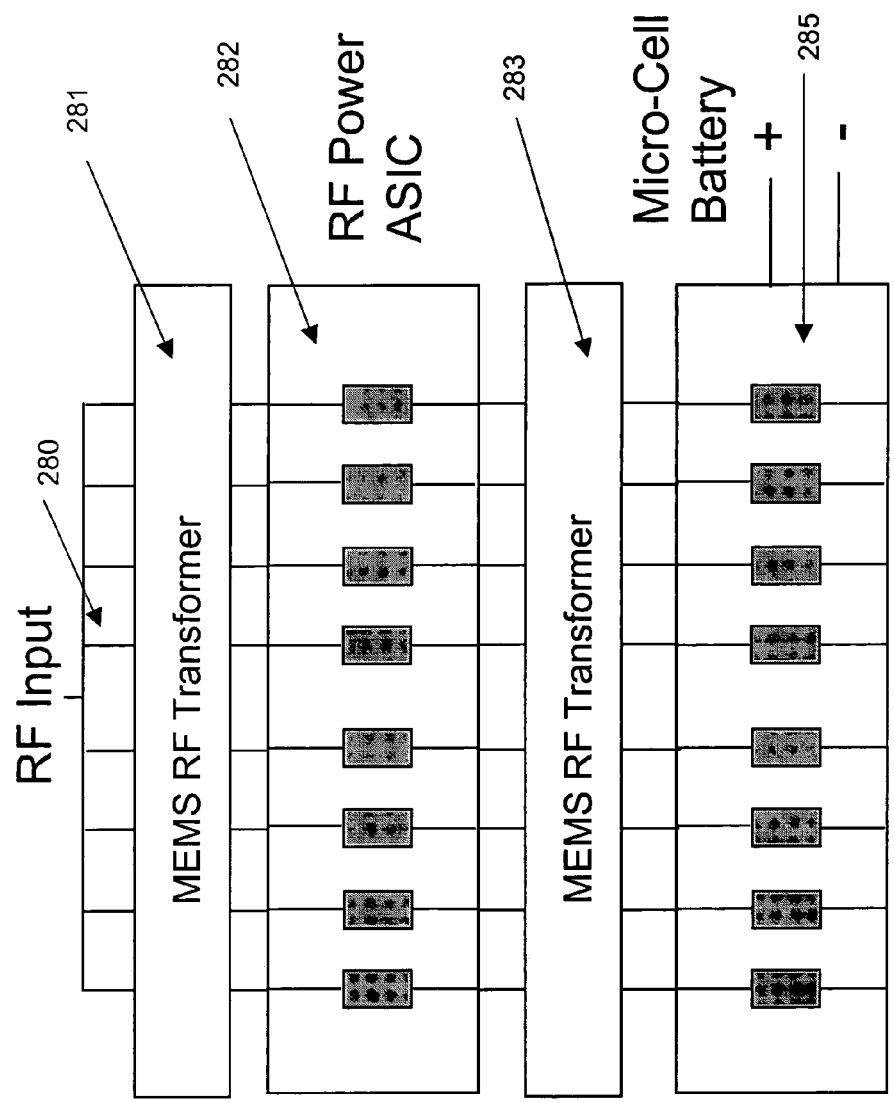
FIG. 9 shows an application specific integrated circuit (ASIC) chip implementation of the ECS circuitry shown in FIG. 8.

FIG. 9 shows an ASIC chip implementation of the ECS circuitry shown in FIG. 8. The RF input 280 corresponds to the antenna 130 of FIG. 8 for receiving harvested RF energy; the MEMS RF transformer 281 corresponds to the transformer 161 of FIG. 8; the RF power ASIC 282 corresponds to the rectifier circuit 162 and the trickle charger 164 of FIG. 8 and any other desired circuitry for the ECS, such as filters, impedance matching circuitry, etc.; and the micro-cell battery 285 corresponds to the battery 165 of FIG. 8. The battery 165 or 285 is a part of the ESS, which is described next.

Energy Storage Subsystem (ESS)

Figure 10:
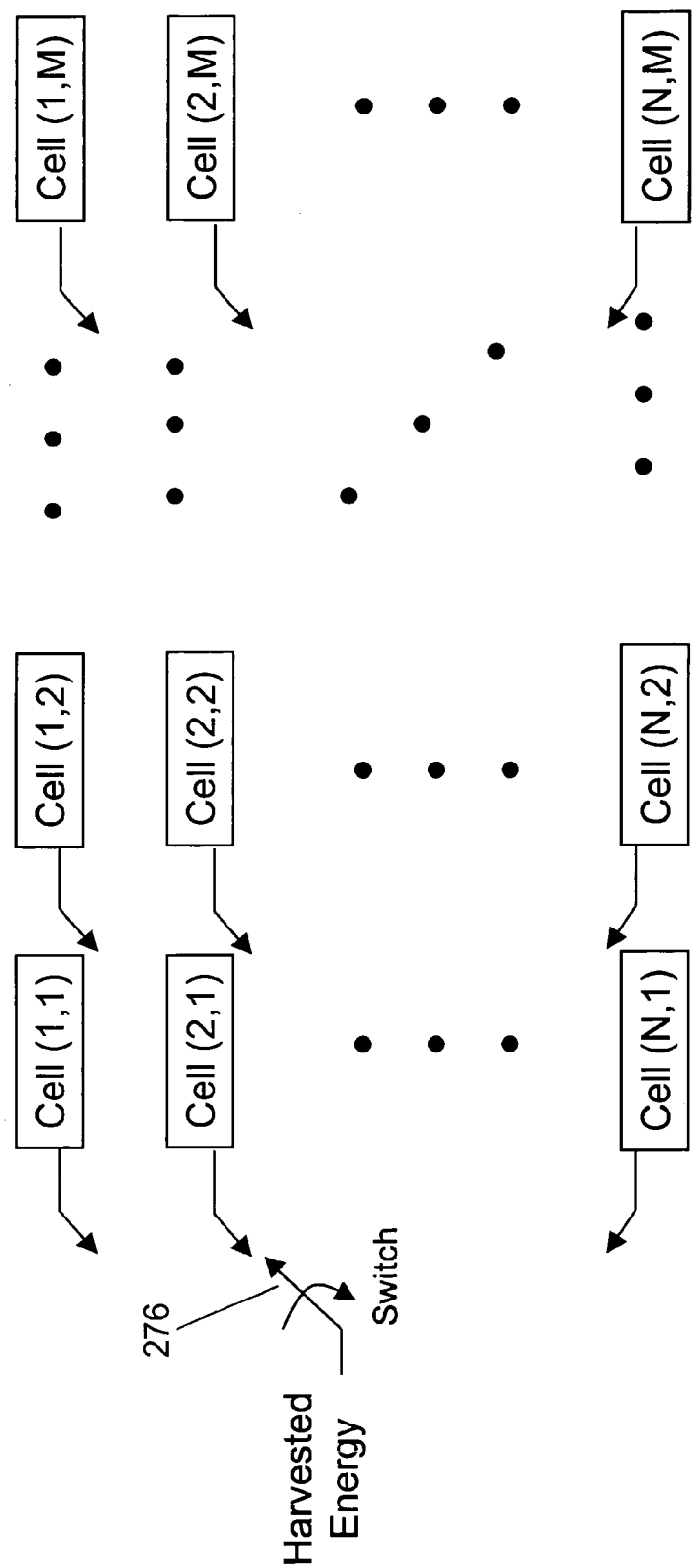
FIG. 10 shows an array of battery micro-cells of an energy storage subsystem in accordance to an embodiment of the present invention.

According to a preferred embodiment of the present invention, the ESS includes a rechargeable battery 165, which can be a complete battery or an array of micro-cells of battery. If battery 165 includes a complete battery, the trickle charger 164 preferably provides a larger potential difference between terminals and more power for charging during a period of time. If battery 165 includes individual battery cells, the trickle charger 164 preferably provides smaller amounts of power to each individual battery cell, with the charging proceeding on a cell by cell basis. FIG. 10 shows an array of battery micro-cells according to an embodiment of the present invention. The ESS charges one or more micro-cells as available energy allows. As the load requires power, the combined energy is drawn from a charged P×Q subset (sub-array) of the N×M set (array) of cells to power the device on standby or active mode. N, M, P and Q are all natural numbers (i.e., 1, 2, 3, . . . ), wherein P is a number less than N, and Q is a number less than M. Charging of the remaining cells continues whenever ambient power is available. As the load depletes cells, switches such as switch 276 are used to replace the depleted cells with charged cells. The rotation of depleted cells and charged cells continues as required. As much energy as possible is banked to ensure adequate power is available on demand. Thus, energy is managed on a micro-cell basis.

Figure 11:
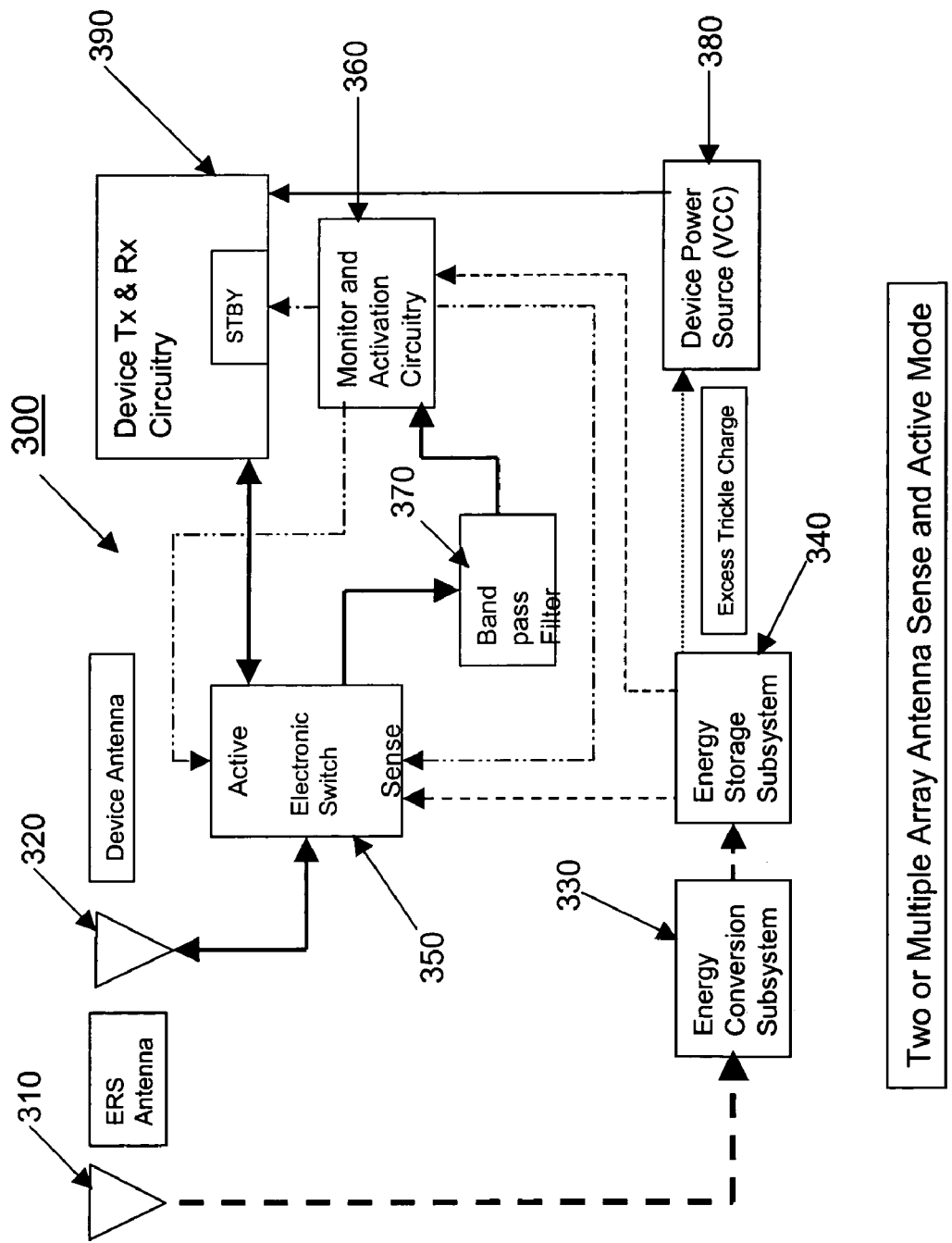
FIG. 11 shows a high level schematic diagram of the Two or Multiple Array Sense and Active Mode in accordance to an embodiment of the present invention.

According to the present invention, there are numerous ways in which the ERS technology can be configured to harvest RF energy. In one embodiment of the present invention, an electronic device, such as a cellular phone, is preferably designed to have two antennas, one for energy harvesting at a desired frequency band and one for performing RF communication at a different frequency band. An example of this dual-antenna design is previously shown in FIG. 6. FIG. 11 shows a high level schematic diagram 300 of a dual-antenna design ERS in accordance to one embodiment of the present invention. As explained earlier, the frequency band at which an antenna receives and transmits signals depends on the physical dimensions of the antenna. Thus, the energy-harvesting antenna 310 and the communication antenna 320 are designed with different dimensions to receive signals at their respectively desired frequency bands. The energy-harvesting antenna 310 may comprise one antenna or an array of like antennas. In this embodiment, parallel operations are possible for energy harvesting and communication. In other words, a user can be using the phone for wireless communication in one frequency band, while at the same instance the energy harvesting antenna 310 and associated circuitry within the phone is collecting electromagnetic energy in another frequency band. The collected electromagnetic energy is passed to integrated circuitry that converts the RF energy into electrical energy. This electrical energy is then distributed for storage in batteries of the ESS 340 for use in powering various electrical components of the phone.

As shown in FIG. 11, communication signals received by the device antenna 320 are sent to communication processing circuitry 390 for transmission and reception. The energy harvesting antenna 310, on the other hand, is connected to an Energy Conversion Subsystem or ECS 330, which is designed to match the impedance and frequency band or bands of the energy harvesting antenna 310 for maximizing input energy received. The ECS 330 is as described earlier with respect to FIG. 8. Its output is conditioned power coming from a trickle charger designed to efficiently charge the power storage devices, such as NiCd, NiMH, or LiIon battery cells, in the energy storage subsystem or ESS 340. Any excess conditioned power from the trickle charger of the ECS 330 is then distributed to the device's main power source 380.

The ESS 340 is as described earlier with respect to FIGS. 8 and 10. It stores the standby power and distributes it to the electronic switching circuitry 350 and the Monitor and Activation Circuitry 360 in both active and standby modes of the device. Alternatively, the ESS 340 may be used to power circuitries 350 and 360 in standby mode of the device, while the device power source 380 powers those circuitries in the device's active mode. The ESS 340 may also be used to complement the device power source 380.

According to yet another embodiment of the present invention, the harvesting antenna 310 and associated circuitries 330 and 340 may be physically located outside of the cellular phone but yet capable of electrical coupling with the phone. For example, the harvesting antenna 310 and associated circuitries may be built into portable physical structures such as briefcases, suitcases, purses, and wearable apparel (cloths) or fixed physical structures by any known means in the art. Thus, when the phone is desired to be charged, it can be stored in any of the aforementioned physical structures and electrically coupled to the built-in harvesting antenna and circuitry for charging purposes. These separate structures facilitate the use of larger antennas (transducers) or arrays of smaller elements whichever is most efficient for collecting the ambient energy. In any case, the larger surface area intercepts more energy.

According to a further embodiment for harvesting RF energy in the present invention, an electronic device, such as a cellular phone, is designed to have two antennas that respectively harvest RF energy and perform wireless communications in the same desired frequency band. In this embodiment, the energy-harvesting antenna and the communication antenna are designed with the same physical dimensions. The communication antenna is connected to a signal level detection system for detecting the strength of RF signals in the desired frequency band. If the strength of the desired RF signals is sufficiently high to sustain both RF communication and energy harvesting, then the level detection system will cause the activation of the energy-harvesting antenna. Thus harvesting proceeds in parallel with communication and the RF energy is converted into electrical power useful for powering various components of the cellular phone without degrading phone service.

Figure 12:
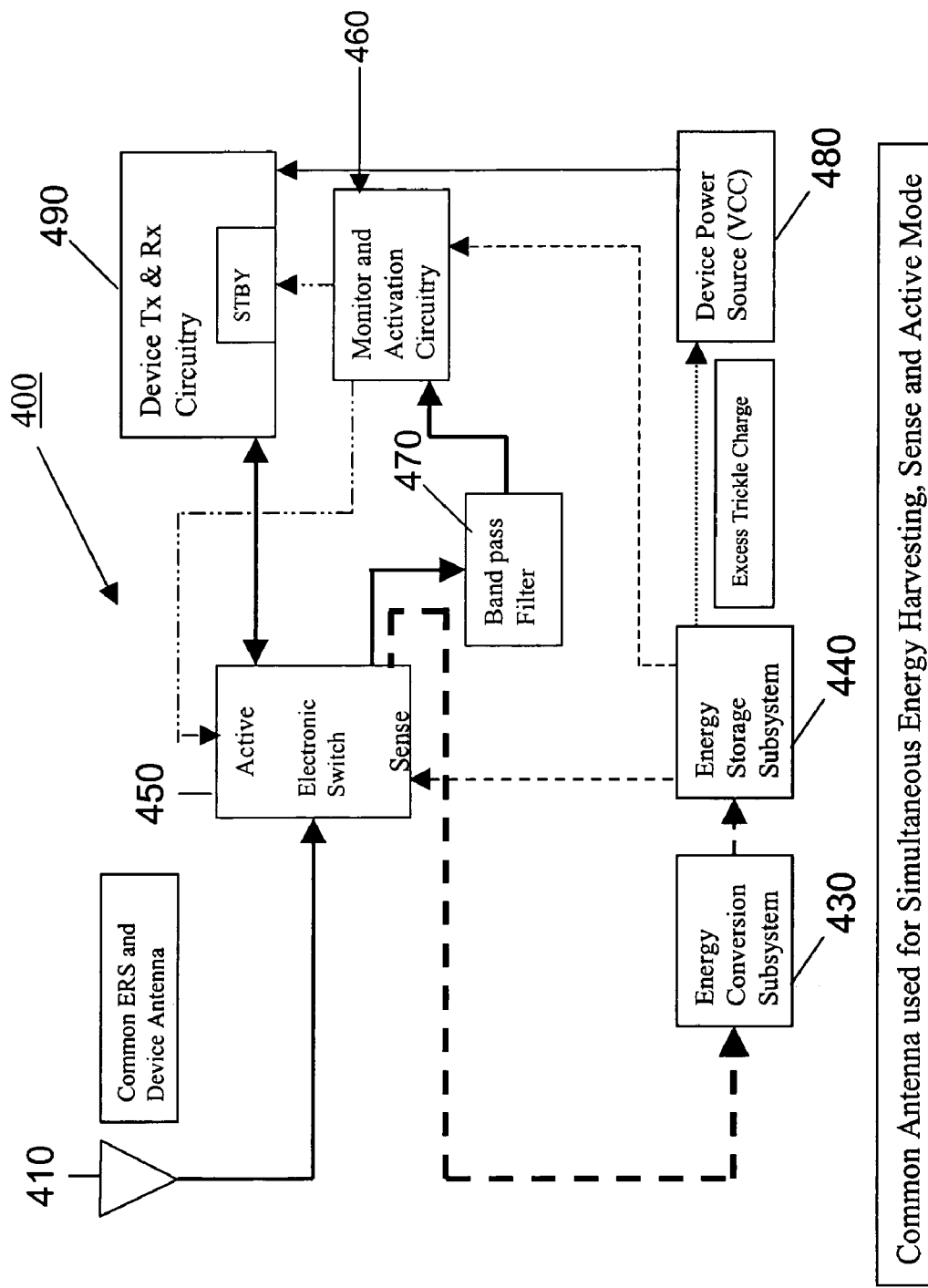
FIG. 12 shows a high level schematic diagram of the Common Antenna Sense and Active Mode in accordance to an embodiment of the present invention.

According to another embodiment for harvesting RF energy in the present invention, a single antenna or an array of like antennas in an electronic device, such as a cellular phone, is used for both energy harvesting and communication purposes. FIG. 12 shows a high level schematic diagram 400 of the Common Antenna for Simultaneous Energy Harvesting, Sense and Active Mode in accordance with this embodiment. This mode requires modifications to the device's antenna switching and filter circuitry to allow communication signals in along with collected RF energy for harvesting. The communication signals are filtered and directed to the receiver's communication circuitry while the noise or interference portions of the received RF signals are filtered out and sent to the energy harvesting circuitry within the electronic device. This noise filtering technique is illustrated back in FIG. 7, where incoming communication signals 1 and the ambient RF energy 3 are filtered by a filter bank 250, which may reside in the switching circuitry 450 shown in FIG. 12. The communication signals 1 are then directed to the receiver's communication circuitry 255, which is shown as communication processing circuitry 490 in FIG. 12, while the noise or interference RF portions 3 are filtered out and sent to the energy harvesting circuitries, which include the ECS 430 and ESS 440.

Figure 13:
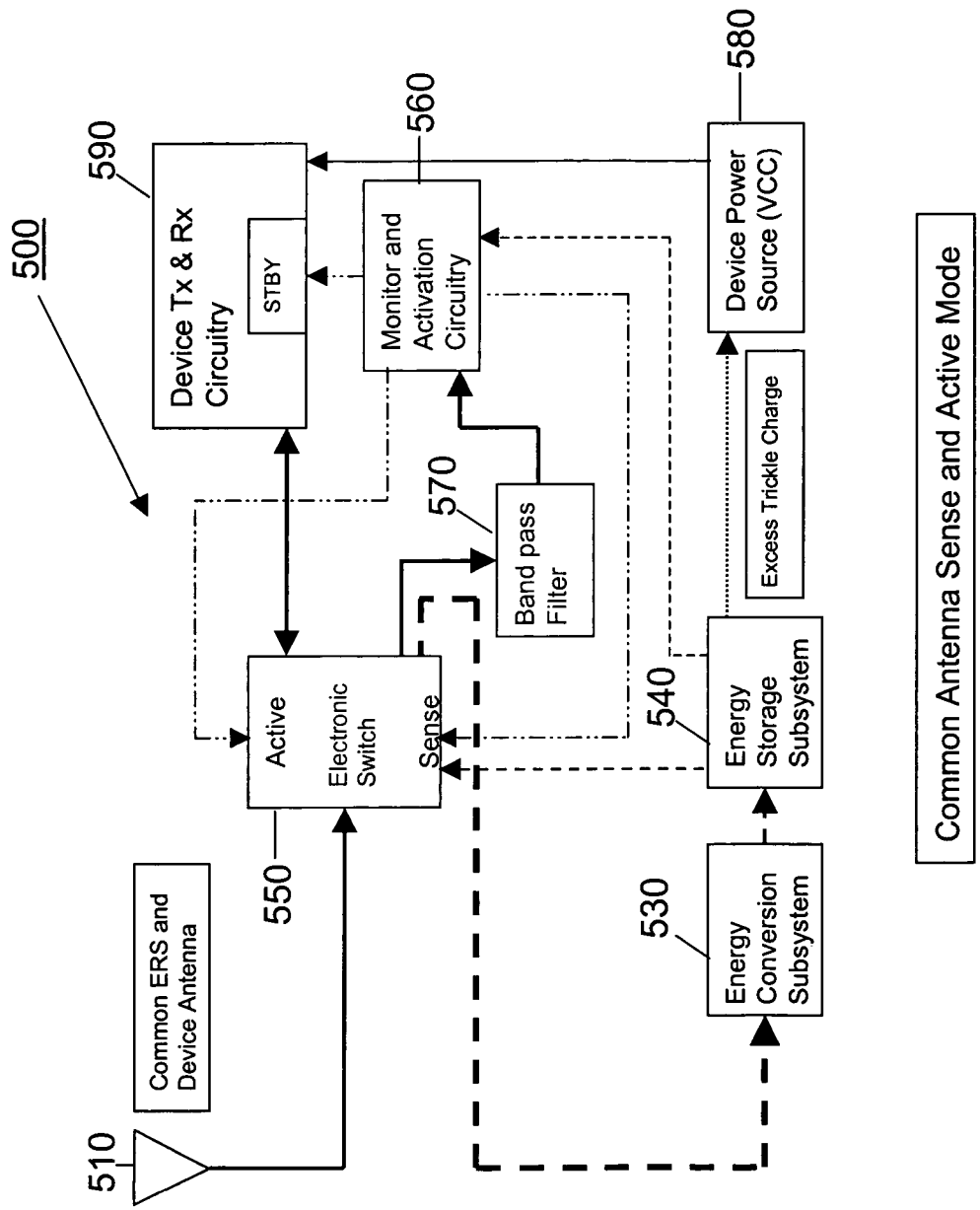
FIG. 13 shows a high level schematic diagram of the Common Antenna for Simultaneous Energy Harvesting, Sense and Active Mode in accordance to an embodiment of the present invention.

According to still another embodiment for harvesting RF energy in the present invention, a single antenna or an array of like antennas in an electronic device, such as a cellular phone, is again used for both energy harvesting and communication purposes. FIG. 13 shows a high level schematic diagram 500 of the Common Antenna Sense and Active Mode in accordance with this embodiment. Here, the single antenna or antenna array 510 is connected to the energy harvesting circuitries 530 and 540 and communication circuitry 590 by a switch 550, which is slaved to the various powering modes of the electronic device. For example, when the phone is in the power-on mode, the switch 550 is programmed to connect the antenna 510 with the communication circuitry 590 to receive the RF communication signals and enable wireless communication with the phone. However, when the phone is in the standby mode, the switch is programmed to connect the antenna 510 with the harvesting circuitries, which then converts the electromagnetic energy in the same RF communication signals into electrical power for powering the electronic device in the standby mode.

The normal operation of an electronic device having the ERS technology as depicted in FIGS. 11 and 12 may also include a standby or sleep mode, as described above with regard to FIG. 13. When the electronic device is set in a standby mode, the electronic switching circuitry (350 or 450) of the ERS (300 or 400) within the electronic device is placed in a Sense Mode. As shown in both FIGS. 11 and 12, the monitor and activation circuitry (360 or 460) is used to set the electronic switching circuitry (350 or 450) in a sense mode. In this mode, signals received by the device's communication antenna (320 or 410) are sent to a band pass filter (370 or 470) to retrieve an activation signal, which is passed on to the monitor and activation circuitry (360 or 460) that is watching for the activation signal. The activation signal can be anything defined by the device's manufacturer, such as a trigger signal or an emergency beacon for activating a desired system. When a turn-on signal brings the electronic device out of standby mode, the monitor and activation circuitry (360 or 460) sends an active signal to the electronic switching circuitry (350 or 450) to connect the communication antenna (320 or 410) to the device's communication circuitry (390 or 490). The device's turn-on signal may be manually provided by a user turning on the electronic device, or it may be brought on by the reception of the activation signal by the monitor and activation circuitry (360 or 460).

Again, the harvesting circuitries in the above embodiments may be physically located apart from the communication circuitry. For example, the harvesting circuitries may be built into portable structures such as briefcases, suitcases, handbags, and purses by any known means in the art, while the communication circuitries and the switch are built into the phone itself. Thus, when the phone is desired to be charged, it can be stored in any of the aforementioned portable structures and electrically coupled to the harvesting circuitries built into the structure for charging purpose.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. Furthermore, any means-plus-function clauses in the claims (invoked only if expressly recited) are intended to cover the structures described herein as performing the recited function and all equivalents thereto, including, but not limited to, structural equivalents, equivalent structures, and other equivalents.

The invention claimed is:

1. An energy reclamation device, comprising:
a radio frequency (RF) energy collector for receiving ambient RF energy;
a solar energy collector for receiving ambient solar energy;
a vibration energy collector for receiving ambient vibration energy;
at least one conversion circuit for converting the ambient RF energy, the ambient solar energy, and the ambient vibration energy to electrical power; and
a power storage for storing the electrical power;
wherein the RF energy collector comprises one antenna to receive RF signals and wherein the received RF signals are sent to the at least one conversion circuit only when the energy reclamation device is in standby mode.

2. The energy reclamation device of claim 1, wherein the at least one antenna is designed to receive ambient RF energy in a selected frequency range.

3. The energy reclamation device of claim 1, wherein the RF energy collector comprises a plurality of antennas.

4. The energy reclamation device of claim 3, wherein an antenna in the plurality of antennas transmits and receives RF signals used for communications.

5. The energy reclamation device of claim 1, wherein the ambient RF energy comprises ambient RF signals.

6. The energy reclamation device of claim 1, wherein the solar energy collector comprises an array of solar cells.

7. The energy reclamation device of claim 1, wherein the vibration energy collector comprises a piezoelectric transducer.

8. The energy reclamation device of claim 1, wherein the ambient vibration energy comprises ambient acoustic energy.

9. The energy reclamation device of claim 1, further comprising a mechanical energy collector for receiving ambient mechanical energy and using the at least one conversion circuit to convert the ambient mechanical energy to electrical power.

10. The energy reclamation device of claim 9, wherein the mechanical energy collector comprises a mechanical transducer.

11. The energy reclamation device of claim 9, wherein the ambient mechanical energy is derived from acceleration of the energy reclamation device.

12. The energy reclamation device of claim 1, wherein at least one conversion circuit comprises a rectifier.

13. The energy reclamation device of claim 1, wherein the at least one conversion circuit is formed on an application specific integrated circuit (ASIC) chip that is integrated with the RF energy collector, solar energy collector, and the vibration energy collector.

14. The energy reclamation device of claim 1, wherein the power storage comprises a battery.

15. The energy reclamation device of claim 14, wherein the battery comprises a plurality of battery micro-cells.

16. The energy reclamation device of claim 15, further comprising a trickle charger for charging the battery micro-cells on a cell by cell basis.

17. The energy reclamation device of claim 1, wherein the power storage comprises a plurality of batteries.

18. The energy reclamation device of claim 1, wherein the electrical power is equal to or less than five watts.

19. The energy reclamation device of claim 1, wherein the RF antenna to receives RF signals comprising ambient RF signals and RF signals used for communications.

20. The energy reclamation device of claim 19, further comprising a filter for filtering the received RF signals into an interference portion and a communication portion.

21. The energy reclamation device of claim 19, wherein the interference portion of the received RF signals is sent to the at least one conversion circuit and the communication portion of the received RF signals is not sent to the at least one conversion circuit.

22. An energy reclamation apparatus, comprising:
a base component;
a radio frequency (RF) energy collecting component for receiving ambient RF energy;
a solar energy collecting component for receiving ambient solar energy;
a vibration energy collecting component for receiving ambient vibration energy;
at least one conversion component for converting the ambient RF energy, the ambient solar energy, and the ambient vibration energy to electrical power used to power the energy reclamation apparatus;
a power storage component for providing additional electrical power to the energy reclamation apparatus if the energy reclamation apparatus requires more electrical power than is converted by the at least one conversion component; and
wherein the RF energy collecting component, the solar energy collecting component, vibration energy collecting component, the at least one conversion component, and the power storage component are mounted onto the base component;
wherein the RF energy collecting component comprises one antenna to receive RF signals and wherein the received RF signals are sent to the at least one conversion component only when the energy reclamation device is in standby mode.

23. The energy reclamation apparatus of claim 22, further comprising a switching component for receiving an activation signal indicating whether the energy reclamation apparatus is in power-on mode or standby mode.

24. The energy reclamation apparatus of claim 23, further comprising an activation component for receiving the activation signal from the switching component.

25. The energy reclamation apparatus of claim 22, wherein the at least one antenna is designed to receive ambient RF energy in a selected frequency range.

26. The energy reclamation apparatus of claim 22, wherein the RF energy collecting component comprises a plurality of antennas.

27. The energy reclamation apparatus of claim 26, wherein an antenna in the plurality of antennas transmits and receives RF signals.

28. The energy reclamation apparatus of claim 22, wherein the ambient RF energy comprises ambient RF signals.

29. The energy reclamation apparatus of claim 22, wherein the solar energy collecting component comprises an array of solar cells.

30. The energy reclamation apparatus of claim 22, wherein the vibration energy collecting component comprises a piezoelectric transducer.

31. The energy reclamation apparatus of claim 22, wherein the ambient vibration energy comprises ambient acoustic energy.

32. The energy reclamation apparatus of claim 22, further comprising a mechanical energy collecting component for receiving ambient mechanical energy and using the at least one conversion component to convert the ambient mechanical energy to electrical power.

33. The energy reclamation apparatus of claim 32, wherein the mechanical energy collecting component comprises a mechanical transducer.

34. The energy reclamation apparatus of claim 32, wherein the ambient mechanical energy is derived from acceleration of the energy reclamation apparatus.

35. The energy reclamation apparatus of claim 22, wherein at least one conversion component comprises a rectifier.

36. The energy reclamation apparatus of claim 22, wherein the at least one conversion component is formed on an application specific integrated circuit (ASIC) chip that is mounted onto the base component.

37. The energy reclamation apparatus of claim 22, wherein the power storage component comprises a battery.

38. The energy reclamation apparatus of claim 37, wherein the battery comprises a plurality of battery micro-cells.

39. The energy reclamation apparatus of claim 38, further comprising a trickle charging component for charging the battery micro-cells on a cell by cell basis.

40. The energy reclamation apparatus of claim 22, wherein the power storage component comprises a plurality of batteries.

41. The energy reclamation apparatus of claim 22, wherein the electrical power generated by the at least one conversion component is equal to or less than five watts.

42. The energy reclamation apparatus of claim 22, wherein the RF energy collecting component receives RF signals comprising ambient RF signals and RF signals used for communications.

43. The energy reclamation apparatus of claim 42, further comprising a filter component for filtering the received RF signals into an interference portion and a communication portion.

44. The energy reclamation apparatus of claim 43, wherein the interference portion of the received RF signals is sent to the at least one conversion component and the communication portion of the received RF signals is not sent to the at least one conversion component.

* * * * *